United States Patent [19]

Arganbright

[11] 3,728,415

[45] Apr. 17, 1973

[54] PRODUCTION OF N-BUTENES FROM ETHYLENE

[75] Inventor: Robert P. Arganbright, Houston, Tex.

[73] Assignee: Petro-Tex Chemical Corporation, Houston, Tex.

[22] Filed: Mar. 25, 1971

[21] Appl. No.: 128,144

[52] U.S. Cl. .................260/683.15 R, 252/466 PT
[51] Int. Cl. ................................................C07c 3/20
[58] Field of Search.............................260/683.15

[56] References Cited

UNITED STATES PATENTS

| | | | |
|---|---|---|---|
| 2,692,259 | 10/1954 | Peters et al. | 260/683.15 X |
| 3,402,217 | 9/1968 | Engelbrecht et al. | 260/683.15 |
| 2,656,398 | 10/1953 | Devault | 260/683.15 |
| 3,330,882 | 7/1967 | Albright | 260/683.15 |
| 3,431,316 | 3/1969 | Banks | 260/683.15 X |
| 3,689,589 | 9/1972 | Reusser | 260/683.15 |

FOREIGN PATENTS OR APPLICATIONS

| | | | |
|---|---|---|---|
| 1,205,677 | 9/1970 | Great Britain | 260/683 |

*Primary Examiner*—Paul M. Coughlan, Jr.
*Attorney*—G. Baxter Dunaway

[57] ABSTRACT

Ethylene can be dimerized in excellent yields over a unique catalyst of palladium oxide with molybdenum oxide and/or tungsten oxide on a catalyst support. The catalyst is specific for ethylene. For example 52 weight % n-butenes were produced over a 2% PdO – 10% $MoO_3$ on Alcoa H-151 alumina at an ethylene feed rate of 50 ml/min. at 35°C. A 2% PdO–10% $WO_3$ on Alcoa H-151 alumina at ethylene feed rate of 100 ml/min. and 70°C. gave 56 wt. % n-butenes.

9 Claims, No Drawings

PRODUCTION OF N-BUTENES FROM ETHYLENE

This invention relates to a novel catalytic process for the preparation of butenes from ethylene.

It is often desirable to convert ethylene to higher olefinic compounds. For example, in catalytic cracking of petroleum products substantial quantities of ethylene are produced which can be converted to the more valuable butenes. Butene-1, for example, can be readily polymerized with Ziegler type catalyst to produce a homopolymer of unique and different properties over other hydrocarbon polymers. Normal butenes are the feed for a variety of dehydrogenations to produce butadiene which is used in styrene-butadiene rubber.

U.S. Pat. No. 3,013,066 taught that dimers and codimers of alpha-olefins could be prepared in an anhydrous reaction medium in the presence of salts of the noble metals of Group VIII of the Periodic Table. This reaction required high pressure, i.e., at least 10 atmospheres and preferably between 50 and 1500 atmospheres at temperatures of 20° to 275° C.

Copending application Ser. No. 59,370 filed July 29, 1970 disclosed a heterogeneous system that overcame many of the objections of the homogeneous system. In the present invention an improved dimerization catalyst is employed to obtain higher yields than the supported palladium salt catalyst while maintaining the advantages of the heterogeneous system.

In the present invention a single feed, i.e., ethylene is dimerized. Dimerization is understood to be the addition of one molecule of ethylene to one other molecule of ethylene to produce a product having twice the molecular weight of ethylene. Stated otherwise a dimerization is the reaction of olefinic molecules to produce one-half the number of other olefinic molecules. The product of ethylene dimerization is a normal $C_4$ olefin, either butene-1 or butene-2.

Briefly stated the present invention is a process for dimerizing ethylene comprising contacting ethylene with a supported catalyst comprising (a) oxygen, (b) palladium and (c) molybdenum, tungsten or molybdenum and tungsten.

The dimerization is carried out in vapor phase. The pressure can range from 0 to 1000 psig, preferably no more than 50 psig, however, the rate of reaction to produce an equilibrium mixture of n-butenes was found to be controlled by mass transfer at 1 atmosphere pressure over a wide range of flow rates. The use of 50 psig pressure offered no improvement in the rate of reaction but increased the production of $C_3$ by-products. Generally the temperature of the reaction will not be too severe and will range from about 0° to 150° C., preferably about 25° to 100° C.

In addition to ethylene the reaction can contain an inert diluent although it is not necessary. Suitable inert diluents include alkyl and aromatic hydrocarbons such as butane, hexane, octane, benzene, toluene, xylene and the like.

Although the by-products are not particularly bothersome they may, if present, be reduced or eliminated by the addition of a small (e.g. 0.1 to 0.3 moles per mole of ethylene feed) amount of air or a polar material such as water to the ethylene feed. The effect of these additives appears to be a slight poisoning of the catalyst thus there is also a reduction in the conversion to the ethylene dimer.

The ethylene can be conducted through the reaction chamber at a wide range of flow rates. The optimum flow rate will depend on such variables as the temperature of the reaction, pressure, catalyst particle size and surface area and the like. Generally the flow rates will be within the range of about 10 to 280 volumes of ethylene per volume of reaction zone containing catalyst per hour referred to as gaseous hourly space velocity (GHSV) and is expressed as reciprocal hours.

The unique dimerization catalyst of the present invention comprises oxygen, palladium and one or both of molybdenum and tungsten. The catalyst in particular comprises a mixture of an oxide of palladium and an oxide selected from the group consisting of molybdenum, tungsten and mixtures thereof on a support. The catalyst can be prepared in several ways to obtain the benefits therefrom. For example, the oxides of palladium and molybdenum or tungsten can be slurried together then deposited on the support. Or the oxide components may be applied sequentially from a slurry such as placing $MoO_3$ on an alumina support to which a palladium compound is applied. Another approach is to employ soluble compounds of Pd, Mo and W which are applied simultaneously or sequentially then dried and converted to the oxides by air oxidation. Another modification of this approach is to precipitate or coprecipitate Pd and Mo and/or W onto the support and to convert to the oxide subsequently.

One preferred method of catalyst preparation has been to impregnate a support material with a solution of ammonia molybdate or ammonium meta-tungstate in solution, then convert molybdenum or tungsten to the corresponding oxides by heating in a non-reducing atmosphere. The palladium is then deposited on the Mo or W oxide as dichloro palladium tetramine which is converted to $PdCl_2$ on heating. By heating the palladium containing catalyst in a reducing atmosphere, e.g. hydrogenating at 540° C. the $PdCl_2$ is converted to metallic Pd which then is oxidized by molecular oxygen, (usually air) at 400°–600° C. to PdO. This procedure provides a means of consistent catalyst quality.

Similarly, regardless of the method of catalyst preparation a catalyst providing more uniform results can be obtained by reduction, for example with hydrogen, followed by oxidation with molecular oxygen as a pretreatment of the catalyst prior to use. The catalyst of the invention is easily regenerated during use by reoxidation with air at 400°–600° C. The regeneration burns off any coke that has formed and converts any reduced metal back to the catalytically active oxide state.

A wide variety of supports can be used for the active catalyst components, such as, silica, silica-alumina, alumina, aluminum phosphate, zirconia, boria, titania, magnesia, pumice, kieselguhr, firebrick and the like. The supported catalyst can be used in a fixed bed or in a movable particulate form, as for example, in a fluidized bed. The term support is meant not only the conventional supports listed above but include a support of one or more of the catalyst components such as palladium oxide deposited on a support of tungsten oxide. The surface will be about 2 to 500m²/gram. An alumina support is preferred.

The proportion of molybdenum oxide or tungsten oxide on the support can be varied, generally about 5 to 95 weight percent with the more preferable proportion being in the range of 8 to 15 weight percent of the support. The palladium oxide will be present in the catalyst in a weight ratio of palladium oxide to the oxides of molybdenum and tungsten of about .02:1 to .6:1 more usually about .1:1 to .4:1.

EXAMPLE 1

A 10% $MoO_3$ precatalyst was prepared by impregnating dry commercial alumina ⅛ inch pellets (Alcoa H-151) with sufficient ammonium molybdate hydrate in solution to give 10% $MoO_3$ on the support (an excess of a saturated solution heated with 50 ml of Alcoa H-151 alumina will give about 10 percent by weight $MoO_3$ on the support). The impregnated alumina was dried and heated in air for two hours at 525°–550° C then cooled to room temperature (about 25° C.). The $WO_3$ precatalyst was prepared in the same manner using ammonium meta-tungstate in solution.

The palladium component was added to the cooled $MoO_3$ precatalyst by adding 35 ml of aqueous ammonia solution containing 0.5 gram of $PdCl_2$ for a 1% PdO, 1 gram of $PdCl_2$ for 2% PdO, 2 grams of $PdCl_2$ for a 4% PdO etc. on the $MoO_3$-support precatalyst. The $PdCl_2$—$MoO_3$ precatalyst was treated with air at 540° C. and finally with pure hydrogen for ½ hour. The reduced precatalyst was then reoxidized with a flow of air (about 200 ml/min) at 540° C. for several hours during which time it changed from black to light gray in color. Catalysts prepared in this manner were used in the following examples.

EXAMPLE 2

Fifty ml of spent 2% PdO–10%$MoO_3$ on alumina were taken from a prior run and regenerated by a flow of air at 540° C. until all of the black color was removed (about 3 hours). It was then reduced with hydrogen (diluted with nitrogen for initial exothermic reaction) for 1 hour at 540° C. followed by reoxidation with air for 1 hour at 540° C. and cooled to 25° C. under nitrogen. The catalyst was loaded into a tubular reactor and ethylene was fed at 50 ml/min. The temperature was about 35° C. After 40 minutes analysis of the effluent by gas-liquid chromatograph showed 20 wt. % ethylene, 31 wt. % propylene, 44 wt. % n-butenes and 5 wt. % pentenes. After 3½ hours the effluent analyzed as 35.7 wt. % ethylene, 12.2 wt. % propylene, 52.1 wt. % n-butenes and no $C_5$ Nos.

EXAMPLE 3

The catalyst was a 2% PdO-10%$MoO_3$ on a low sodium alumina support (Pechiney-Saint Gobain GCS 300) prepared in the manner described in Example 1. Fifty ml was loaded into a tubular reactor. Ethylene was fed at 50 ml/min. After 1 to 2½ hours with sampling at ½ hour intervals in effluent remained constant at 54.wt. % ethylene, 12.8 wt. % propylene, and 32.3 wt. % n-butenes at 35° C. At 18 hours the analysis remained the same. After 18 hours on stream the temperature was raised to 50° C. The effluent showed 43.9 wt. % ethylene, 12.5 wt. % propylene, 39.7 wt. % n-butenes and 3.9 wt. % pentenes. The analysis was the same after 1½ hours at 50° C.

EXAMPLE 4

A 2% PdO 10% $WO_3$ catalyst on alumina (Alcoa H-151) was prepared according to the method of Example 1. Fifty ml of catalyst was loaded into a tubular reactor and ethylene fed at the rate of 100 ml/min at 70° C. After ½ hour the effluent analysis was 44.3 wt. % ethylene, trace of propylene and 55.7 wt. % n-butenes.

EXAMPLE 5

A 2% PdO – 95% $WO_3$ catalyst was prepared by depositing 1 gram of $PdCl_2$ on 50 grams of Harshaw W-0602. The W-0602 is 95% $WO_3$ and served as the support as well. The precatalyst $PdCl_2$ - $WO_3$ was loaded into the tubular reactor and treated with air at 520° C. to produce the oxidized and activated catalyst. Ethylene was passed over the catalyst at about 25° C. at a flow rate of 80 ml/min. The conversion to butene was 60 wt. % (about 92% 2 -butene and 8% 1-butene) 10 wt. % propylene and 30 wt. % ethylene. The reaction was initially exothermic and the reactor warmed to about 50° C. The temperature was maintained at 55° C. at 90 ml/min ethylene for 7 hours at which time the effluent was analyzed as 49.9 wt. % ethylene, 50 wt. % n-butenes and about 0.1 wt. % propylene.

The invention claimed is:

1. A process for dimerizing ethylene to form butene comprising contacting ethylene in vapor phase at a temperature of from 0° to 150° C and pressure of from 0 to 50 p.s.i.g. with a catalyst comprising an oxide of palladium and an oxide selected from the group consisting of molybdenum oxide, tungsten oxide and mixtures thereof, wherein the weight ratio of palladium oxide to the oxide selected from the group consisting of molybdenum oxide, tungsten oxide and mixtures thereof is about 0.02:1 to about 0.6:1.

2. The process according to claim 1 wherein the catalyst is supported on an inert support material selected from the group consisting of silica, silica-alumina, alumina, aluminum phosphate, zirconia, boria, titania, magnesia, pumice, kieselguhr, and fire brick.

3. The process according to claim 1 wherein the temperature is in the range of about 25° to 100° C.

4. The process according to claim 2 wherein the catalyst comprises 5 to 95 weight % based on the support of the oxide selected from the group consisting of molybdenum oxide, tungsten oxide and mixtures thereof.

5. The process according to claim 4 wherein the weight ratio of pal-ladium oxide to the oxide selected from the group consisting of molybdenum oxide, tungsten oxide and mixtures thereof is about .1:1 to .4:1.

6. The process according to claim 2 wherein the support is alumina.

7. The process according to claim 6 wherein the catalyst comprises palladium oxide and molybdenum oxide.

8. The process according to claim 6 wherein the catalyst comprises palladium oxide and tungsten oxide.

9. The process according to claim 1 wherein the catalyst comprises palladium oxide and tungsten oxide.

* * * * *